United States Patent [19]

Anzai et al.

[11] Patent Number: 4,816,524

[45] Date of Patent: Mar. 28, 1989

[54] PROCESS FOR PREPARING METHACRYLIMIDE-CONTAINING POLYMERS

[75] Inventors: Hisao Anzai; Hideaki Makino, both of Ohtake; Isao Sasaki, Hiroshima; Kozi Nishida; Masaru Morimoto, both of Ohtake, all of Japan

[73] Assignee: Mitsubishi Rayon Company Limited, Tokyo, Japan

[21] Appl. No.: 857,163

[22] Filed: Apr. 29, 1986

[30] Foreign Application Priority Data

May 1, 1985 [JP] Japan ............................ 60-92256
Jun. 21, 1985 [JP] Japan ............................ 60-135430
Sep. 30, 1985 [JP] Japan ............................ 60-216789
Oct. 30, 1985 [JP] Japan ............................ 60-241726

[51] Int. Cl.$^4$ .................................................. C08F 8/32
[52] U.S. Cl. ........................... 525/378; 525/329.9; 525/330.5; 525/379
[58] Field of Search ........................... 525/378, 379

[56] References Cited

U.S. PATENT DOCUMENTS

| | | | |
|---|---|---|---|
| 2,146,209 | 2/1939 | Graves | 525/374 |
| 3,244,679 | 4/1966 | Schröder et al. | 525/378 |
| 3,284,425 | 11/1966 | Schroder et al. | 260/89.5 |
| 4,209,598 | 6/1980 | Patzchke | 525/378 |
| 4,246,374 | 1/1981 | Kopchik | 525/378 |

FOREIGN PATENT DOCUMENTS

| | | |
|---|---|---|
| 0200530 | 11/1986 | European Pat. Off. |
| 1308359 | 9/1962 | France |
| 2393818 | 1/1979 | France |
| 2528435 | 12/1983 | France |
| 2101139 | 1/1983 | United Kingdom |

OTHER PUBLICATIONS

Chemical Abstracts, vol. 100, no. 16, Apr. 1984, p. 39.

Primary Examiner—Joseph L. Schofer
Assistant Examiner—Bernard Lipman
Attorney, Agent, or Firm—Oblon, Fisher, Spivak, McClelland & Maier

[57] ABSTRACT

Methacrylimide-containing polymers are continuously produced by introducing 10 to 60 wt. % of an inert solvent, 90 to 40 wt. % of methacrylic acid, a methacrylic acid ester or a monomer mixture comprising at least 50 wt. % of methacrylic acid or a methacrylic acid ester, and a radical polymerization initiator and a molecular weight modifier into a polymerization reaction zone, converting at least 80 wt. % of the charged monomer to a polymer at 60°–170° C., adding a compound represented by the formula:

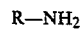

R—NH$_2$ wherein R represents a hydrogen atom, an alkyl group having 1–12 carbon atoms, a cycloalkyl group having 7–11 carbon atoms or an aryl group having 6–10 carbon atoms, to the polymerization reaction liquid, carrying out reaction of the resulting mixture at 150° to 300° C. in an imidization reaction zone, and finally separating volatile substances from the reaction fluid.

23 Claims, 3 Drawing Sheets

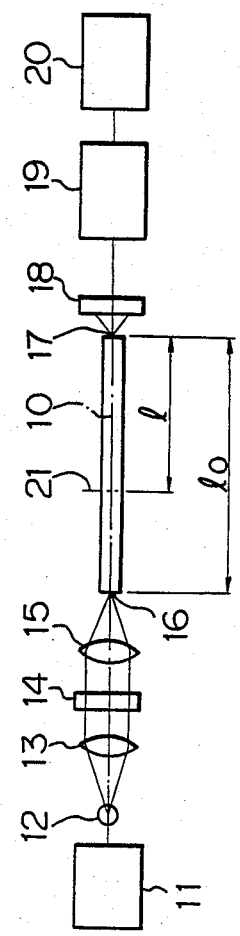
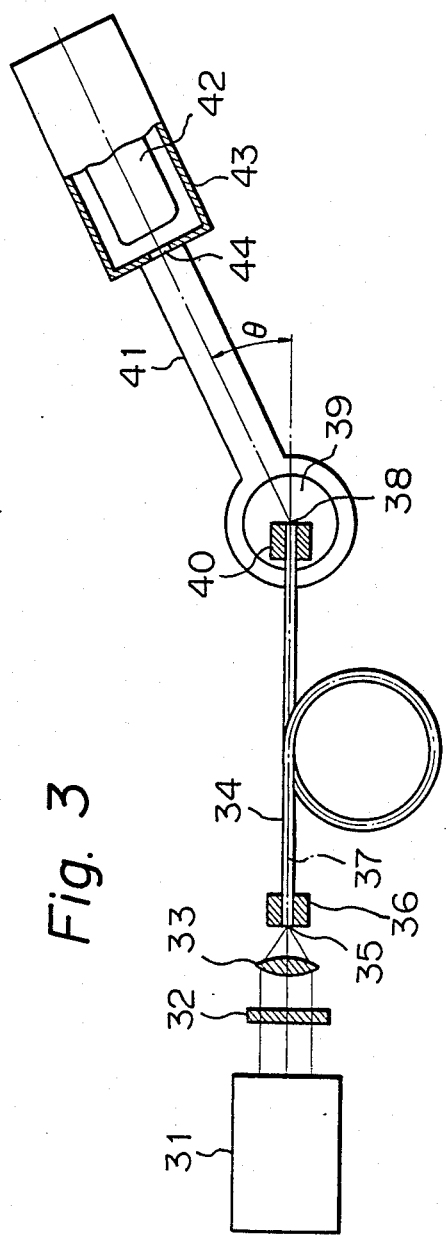
Fig. 2
Fig. 3

PROCESS FOR PREPARING METHACRYLIMIDE-CONTAINING POLYMERS

BACKGROUND OF THE INVENTION

(1) Field of the Invention

The present invention relates to a process for the continuous preparation of a methacrylimide-containing polymer having an excellent transparency and heat resistance.

(2) Description of the Related Art

Since methacrylic resins have excellent transparency, weatherability, and mechanical properties, they are used as high-performance optical materials, decorative materials and parts of automobiles and electric appliances, and applications of these resins to the field of short-distance optical communication and as light sensors have been tried and developed. However, since the heat distortion temperature of methacrylic resins is low, about 100° C., they cannot be easily used in fields where a high heat resistance is required, and therefore, it is eagerly desired to improve the heat resistance of methacrylic resins.

As a method for improving the heat resistance of methacrylic resins, there is known methods in which a methyl methacrylate polymer is imidized. For example, there have been proposed (1) method in which a polymer of acrylic acid, methacrylic acid or an ester thereof is heated and reacted with a primary amine, ammonia or a compound capable of forming ammonia or a primary amine in the presence of a solvent (see U.S. Pat. No. 2,146,209), (2) a method in which a polymer of methyl methacrylate is reacted with a primary amine in the presence of water (see U.S. Pat. No. 3,284,425), and (3) a method in which an acrylic polymer is reacted with ammonia or a primary amine in an extruder (see U.S. Pat. No. 4,246,374).

Since the boiling point of the solvent used in the method (1) is high, it is difficult to completely separate the solvent from the polymer formed by the imidization on a commercial scale, and therefore, the formed polymer is colored and the transparency is degraded. In the method (2), since the reaction is carried out in the presence of water, if it is intended to obtain a partially imidized polymer, hydrolysis occurs in the methyl methacrylate segments and it is difficult to obtain an imidized polymer having an intended high heat resistance. Furthermore, in the method (2), it is difficult to conduct the imidization reaction uniformly. In the method (3), since the imidization reaction is effected between a highly viscous polymer and a gaseous imidizing substance, it is difficult to perform the imidization reaction uniformly, and therefore, a uniformly partially imidized polymer cannot be easily obtained.

Even though the heat resistance is improved in imidized polymers obtained according to the foregoing known methods, if polymers are prepared on a commercial scale, the transparency is degraded, the molecular weight is substantially reduced, or the imidization reaction is uneven. Accordingly, the foregoing known methods are not practically workable.

SUMMARY OF THE INVENTION

It is a primary object of the present invention to overcome the above-mentioned defects of the conventional techniques, and provide a methacrylimide-containing polymer which has an improved transparency and heat resistance while retaining the inherent excellent optical characteristics, mechanical characteristics, weatherability and moldability of a methacrylic polymer.

Another object of the present invention is to provide a process for preparing such a polymer industrially advantageously.

In accordance with the present invention, there is provided a process for the continuous preparation of methacrylimide-containing polymers, which comprises introducing 10 to 60% by weight of an inert solvent, 90 to 40% by weight of methacrylic acid, a methacrylic acid ester or a monomer mixture comprising at least 50% by weight of methacrylic acid or a methacrylic acid ester, and a radical polymerization initiator and a molecular weight modifier into a polymerization reaction zone, converting at least 80% by weight of the charged monomer to a polymer at a temperature of 60° to 170° C., adding a compound represented by the following general formula:

$$R-NH_2 \qquad (1)$$

wherein R represents a hydrogen atom, an alkyl group having 1 to 12 carbon atoms, a cycloalkyl group having 7 to 11 carbon atoms or an aryl group having 6 to 10 carbon atoms, to the polymerization reaction liquid, carrying out reaction of the resulting mixture at a temperature of 150° to 300° C. in an imidization reaction zone, and finally separating volatile substances from the reaction liquid.

BRIEF DESCRIPTION OF THE DRAWINGS

FIG. 2 illustrates an example of the apparatus for measuring the light-transmitting capacity of a light-transmitting member;

FIG. 3 illustrates an example of the apparatus for measuring the numerical aperture of the light-transmitting member.

DESCRIPTION OF THE PREFERRED EMBODIMENTS

Figure 1:
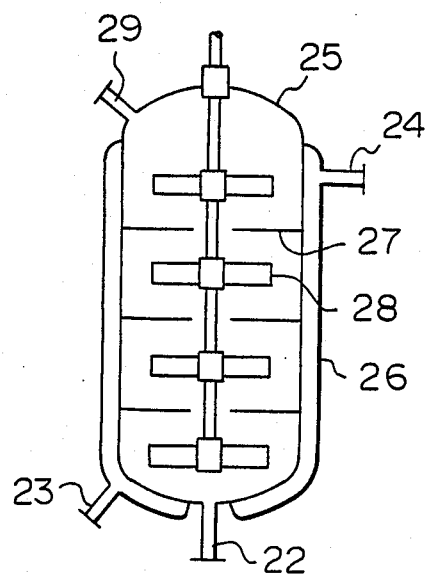
FIG. 1 shows an example of the reaction vessel used for carrying out the present invention.

By the term "methacrylimide-containing polymer" used in the present invention is meant a methacrylic polymer having imide units introduced in the side chains thereof.

The methacrylic polymer in which imide units are to be introduced is obtained by homopolymerizing methacrylic acid or a methacrylic acid ester, or copolymerizing a mixture thereof or a mixture composed of at least 50% by weight of methacrylic acid and/or a methacrylic acid ester and not more than 50% by weight of a monoethylenic monomer copolymerizable therewith, such as an acrylic acid ester, styrene or α-methylstyrene. As the methacrylic acid ester, there can be mentioned ethyl methacrylate, propyl methacrylate, butyl methacrylate, cyclohexyl methacrylate, 2-ethylhexyl methacrylate and benzyl methacrylate, and as the acrylic acid ester, there can be mentioned methyl acrylate, ethyl acrylate, butyl acrylate, cyclohexyl acrylate, 2-ethylhexyl acrylate and benzyl acrylate.

The inert solvent should not inhibit the polymerization reaction or imidization reaction and should not substantially react with the reaction mixture.

A single solvent may be used, but a mixed solvent comprising a poor solvent having a boiling point of 50° to 135° C. under atmospheric pressure and not easily dissolving a methacrylic polymer therein at normal temperature and a good solvent having a boiling point of 50° to 135° C. under atmospheric pressure and being capable of dissolving a methacrylic polymer therein at normal temperature is preferably used. It is especially preferred that such a mixed solvent be used at the stage of the imidization reaction in the imidization reaction zone, though at least one of the solvents constituting the mixed solvent may be used in the reaction zone preceding the imidization reaction zone (either the poor solvent or the good solvent may be used). A preferred poor solvent has a solubility parameter value $\delta$ of 14.0 to 19.5 $(cal/cm^3)^{\frac{1}{2}}$ and a preferred good solvent has a solubility parameter value $\delta$ of 8.5 to 13.9 $(cal/cm^3)^{\frac{1}{2}}$. As the poor solvent, there can be mentioned, for example, methanol, and as the good solvent, there can be mentioned, for example, alcohols such as ethanol, propanol, isopropanol, and butanol, aromatic hydrocarbons such as benzene and toluene, and ketones and ethers such as methylethyl ketone, glyme, 1,2-diethoxyethane, dioxane, and tetrahydrofuran. Among them, benzene and toluene are especially preferred.

The solubility parameter value $\delta$ referred to in the present invention is the value determined based on the standard described in J. Brandrup and E. H. Immergut, Polymer Handbook, Second Ed., John Wiley and Sons, New York, 1975.

If the boiling points of the poor and good solvents in the mixed solvent used in the present invention are higher than 135° C. under atmospheric pressure, it becomes difficult to sufficiently remove volatile substances composed mainly of the solvents from the reaction product obtained by the imidization reaction. If the boiling points of the poor and good solvents are lower than 50° C. under atmospheric pressure, because of an increase of the internal pressure in the reaction system, it is not permissible to elevate the imidization reaction temperature, and therefore, the imidization reaction cannot be sufficiently advanced. Moreover, when volatile substances are separated and removed from the reaction product, volatilization abruptly occurs and it is difficult to control the operation of removing the volatile substances.

If the solubility parameter values $\delta$ of the poor and good solvents in the mixed solvent used in the present invention are outside the ranges described above, uniform polymerization and uniform imidization become difficult, and a methacrylimide-containing polymer having a high quality cannot be easily obtained.

The amount of the solvent used is 10 to 60% by weight based on the sum of the solvent and monomer. If the amount of the solvent used is smaller than 10% by weight, the viscosity of the reaction mixture becomes too high and the handling operation becomes difficult, and furthermore, the polymerization or imidization reaction is not uniformly advanced and the quality of the obtained polymer is degraded. If the amount of the solvent used exceeds 60% by weight, it becomes difficult to separate the solvent from the polymer, the amount of the obtained polymer is small and the process is industrially disadvantageous. It is preferred that the amount of the solvent used be 20 to 50% by weight based on the sum of the solvent and monomer.

The inert solvent used in the present invention expedites diffusion of the imidizing substance in the methacrylic polymer in the imidization reaction and performs the imidization reaction uniformly and promptly. Furthermore, the inert solvent effectively controls the generation of the reaction heat and the removal thereof. By dint of these actions of the inert solvent, a transparent methacrylimide-containing polymer having an excellent heat resistance, which is suitable as an optical material, can be obtained.

The radical polymerization initiator is actively decomposed at the reaction temperature to form radicals. For example, there can be mentioned organic peroxides such as di-tert-butyl peroxide, dicumyl peroxide, methyl ethyl ketone peroxide, di-tert-butyl perphthalate, di-tert-butyl perbenzoate, tert-butyl peracetate, 2,5-dimethyl-2,5-di(tert-butylperoxy) hexane, di-tert-amyl peroxide, benzoyl peroxide, and lauryl peroxide, and azo compounds such as azobisisobutanol diacetate, 1,1-azobiscyclohexanecarbonitrile, 2-phenylazo-2,4-dimethyl -4-methoxyvaleronitrile, 2-cyano-2-propylazoformamide, and 2,2'-azobisisobutyronitrile. These radical polymerization initiators may be used singly or in the form of mixtures of two or more thereof.

Mercaptans customarily used may be used as the molecular weight modifier in the present invention. For example, there can be mentioned primary, secondary and tertiary mercaptans having an alkyl or substituted alkyl group, such as n-butylmercaptan, isobutylmercaptan, n-octylmercaptan, n-dodecylmercaptan, sec-butylmercaptan, sec-dodecylmercaptan and tert-butylmercaptan; aromatic mercaptans such as phenylmercaptan, thiocresol and 4-tert-butyl-o-thiocresol; thioglycolic acid, esters thereof; and mercaptans having 3 to 18 carbon atoms such as ethylene thioglycol. These mercaptans may be used singly or in the form of mixtures of two or more thereof.

The amounts of the radical polymerization initiator and molecular weight modifier are not particularly critical, and the amounts customarily adopted may be adopted in the present invention and the amounts are appropriately determined according to the polymerization temperature and the intended molecular weight of the polymer.

Ordinarily, the solvent, the methacrylic polymer-forming monomer, the radical polymerization initiator and the molecular weight modifier are mixed together in advance, the mixture is introduced into the polymerization reaction zone, and the reaction is carried out at 60° to 170° C. so that at least 80% by weight of the charged monomer is converted to a polymer.

The imidizing substance of the above-mentioned general formula (1) used in the imidization reaction zone partially reacts with the monomer if a large amount of the monomer is left unpolymerized, and a by-product having a high boiling point is formed. Namely, if the polymerization reaction mixture containing a large amount of the unconverted monomer is introduced into the imidization reaction zone, formation of the above-mentioned by-product having a high boiling point is increased, and separation of this by-product from the polymer becomes difficult. Moreover, the presence of the high-boiling-point by-product in the polymer results in discoloration of the polymer or degradation of the quality of the polymer. In order to control formation of the high-boiling-point by-product in the imidization reaction zone, it is indispensable that at least 80% by weight, preferably at least 90%, of the charged monomer should be converted to a polymer in the polymerization reaction zone.

An attainable highest polymerization degree is determined according to the equilibrium between the growth reaction of the active polymer and the reverse growth reaction at a given temperature, that is, according to the polymerization temperature. If the polymerization exceeds 170° C., it becomes difficult to attain a polymerization degree of 80%. On the other hand, if the polymerization temperature is lower than 60° C., the rate of polymerization is reduced and the process becomes economically disadvantageous, and the viscosity is increased and transfer of the reaction liquid becomes difficult. Accordingly, the reaction temperature in the polymerization reaction zone is adjusted to 60° to 170° C., preferably 65° to 160° C. It is preferred that the polymerization be conducted in two polymerization reaction zones. It has been found that in this preferred embodiment, if the conversion of the monomer to a polymer in the first polymerization reaction zone is lower than 40% by weight, the resistance to the thermal decomposition is degraded in the finally obtained methacrylimide-containing polymer. Although the reason for this phenomenon has not been clarified, it is presumed that the terminal structure of the polymer molecule will be changed in relation to the mechanism of the polymerization-terminating reaction. If the thermal decomposition resistance of the polymer is reduced, defects called "silver streaks" are caused to appear by formation of a decomposition product during the molding operation, and not only the surface appearance but also the physical properties are degraded. Accordingly, it is preferred that the conversion of the monomer to a polymer in the first polymerization zone be at least 40% by weight, especially at least 60% by weight. If the reaction liquid is not uniformly mixed in the first polymerization reaction zone and an area having a conversion lower than 40% by weight is locally present, a polymer having a poor thermal decomposition resistance is partially formed. Accordingly, it is preferred that, in the first polymerization reaction zone, sufficient mixing be effected to maintain a substantially homogeneous state. This can be ordinarily attained by using a stirring mixing tank provided with an anchor type, helical ribbon type, screw type or paddle type stirrer.

The polymerization reaction liquid coming from the first polymerization reaction zone is then introduced into the second polymerization reaction zone having a plug flow and is reacted at a temperature of 80° to 170° C. so that at least 80% by weight of the charged monomer is converted to a polymer.

In order to attain a high conversion to a polymer in the second polymerization reaction zone, it is preferable to use a reaction vessel having a plug flow, that is, a reaction vessel having a relatively long shape, in which a reaction mixture is introduced from one end and discharged from the other end and which is designed so that mixing in the longitudinal direction of the reaction vessel is not substantially effected. For example, there can be mentioned a reaction vessel of the screw extruder type as disclosed in U.S. Pat. No. 3,234,303, a columnar reaction vessel as disclosed in U.S. Pat. No. 3,252,950, a tubular reaction vessel having a baffle plate installed therein, as disclosed in U.S. Pat. No. 278,431, and a hollow pipe reaction vessel.

In order to control formation of the above-mentioned high-boiling-point by-product in the imidization reaction zone, it is indispensable that the conversion of the charged monomer to a polymer in the second polymerization reaction zone should be at least 80% by weight, preferably at least 90% by weight.

If the conversion to a polymer is as high as at least 90% by weight, transfer or handling of the reaction liquid becomes difficult. Accordingly, the polymerization temperature in the second polymerization reaction zone should be 80° C. or higher.

The imidizing substance represented by the general formula (1) is added to the polymerization reaction liquid coming from the second polymerization reaction zone, and reaction is carried out at a temperature of 150° to 300° C. in the imidization reaction zone.

In the imidizing substance represented by the general formula R—NH$_2$, R represents a hydrogen atom, an alkyl group, a cycloalkyl group or an aryl group. These alkyl, cycloalkyl and aryl groups may be unsubstituted or substituted with a halogen atom, an alkoxy group, an acyl group or a carboxyl group. As the imidizing substance, there can be mentioned ammonia; amines such as methylamine, ethylamine, n-propylamine, n-butylamine, heptylamine, hexylamine, octylamine, nonylamine, decylamine, dodecylamine, hexadecylamine, octadecylamine, isobutylamine, sec-butylamine, tert-butylamine, isopropylamine, 2-ethylhexylamine, phenetylamine benzylamine, p-chlorobenzylamine and dimethoxyphenetylamine; alanine; glycine; 3'-aminoacetophenone; 2-aminoanthraquinone, and p-aminobenzoic acid. As other examples, there can be mentioned cyclohexylamine, 2-amino-4,6-dimethylpyridine, 3-aminophthalimide, 2-aminopyridine, 2-aminothiazole, 5-amino-1-H-tetrazole, aniline, bromoaniline, dibromoaniline, tribromoaniline, chloroaniline, dichloroaniline, trichloroaniline, and p-toluidine. Among them, ammonia and methylamine are especially preferred. The amount of the imidizing substance used is not particularly critical. It is ordinarily preferred that the imidizing substance be used in an amount of at least 20 mole % based on the monomer units of the polymer. If the amount of the imidizing substance is smaller than 20 mole %, a substantial improvement of the heat resistance cannot be attained.

If the reaction temperature in the imidization reaction zone is lower than 150° C., the advance of the reaction is very slow and the process is economically disadvantageous. If the imidization reaction temperature is higher than 300° C., deterioration of the polymer is caused. Accordingly, the reaction temperature in the imidization reaction zone is 150° to 300° C., preferably 170° to 280° C. The reaction time is determined according to the reaction temperature, the imidizing substance used and the desired imidization degree, but the reaction time is ordinarily 1 minute to 10 hours.

As the reaction vessel used in the imidization reaction zone, there may be used the above-mentioned stirring mixing tank type reaction vessel, screw extruder type reaction vessel, columnar reaction vessel and tubular reaction vessel. Among them, the stirring mixing tank reaction vessel is preferred. If the stirring mixing tank reaction vessel is used, the polymer is uniformly imidized and a methacrylimide-containing polymer having an excellent transparency and heat resistance can be obtained.

If the reaction is carried out in the reaction zone in which the reaction liquid is sufficiently stirred and mixed, the residence time of polymer molecules in the reaction zone differs in a relatively wide distribution and therefore, a mixture comprising molecules differing in the imidization degree according to the residence time is obtained. In order to control the non-uniformity of the imidization degree in polymer molecules and obtain a methacrylimide-containing polymer having an excellent transparency, it is preferred that the imidization reaction be carried out in at least two partitioned reaction zones where the reaction liquid is sufficiently stirred and mixed. In this preferred embodiment, the residence time of the polymer molecules in the imidization reaction zone is uniformalized. This preferred division of the reaction zone can be attained by connecting at least two stirrer-provided tank type reaction vessels through a pump or directly via pipes, or by dividing a stirring tank type reaction vessel into at least two sections in the longitudinal direction by a partition plate or the like and disposing a stirrer in each section.

FIG. 1 illustrates an example of the imidization reaction vessel. A reactor body 25 has a reaction liquid inlet 29 and an outlet 22, and a heating jacket 26 is provided outside the reactor body 25. A heating medium is circulated through an inlet 23 and an outlet 24. The interior of the reactor body is divided into 4 sections by partition plates 27, and stirring vanes 28 are provided in each section.

After termination of the imidization reaction, volatile substances are separated and removed from the reaction liquid to obtain an intended methacrylimide-containing polymer. As means for separating the volatile substances, there is ordinarily adopted a method in which the reaction liquid is heated at 200° to 300° C. under reduced pressure, and a screw extruder or devolatizer is used. The volatile content in the final polymer is controlled below 1% by weight, preferably below 0.5% by weight.

The first effect of the present invention is that a methacrylimide-containing polymer having an excellent transparency and heat resistance can be prepared while retaining the excellent inherent properties of a methacrylic polymer, such as excellent optical characteristics, mechanical characteristics, weatherability and moldability. This effect is due to the fact that since polymerization of the monomer and imidization are continuously and consistently carried out in the presence of a solvent, the reaction is homogeneously advanced and a homogeneous methacrylimide-containing polymer can be obtained with a much narrowed distribution of the imidization degree in polymer molecules, and also to the fact that the conversion, polymerization temperature and reaction manner are effectively controlled in the polymerization zone, especially the first and second reaction zones, so that the above-mentioned characteristics of the methacrylimide-containing polymer are exerted to the utmost.

The second effect of the present invention is that since a methacrylimide-containing polymer is consistently and continuously prepared from a methacrylic polymer-forming monomer in a manner as described hereinbefore, the preparation can be carried out industrially very advantageously.

The present invention will now be described in detail with reference to the following examples that by no means limit the scope of the invention.

In the following examples, all of "parts" and "∓%" are by weight.

In the examples, the physical properties of polymers were measured and determined according to the following methods.

(1) The infrared absorption spectrum was determined according to the KBr disc method using an infrared spectrophotometer (Model 285 supplied by Hitachi Ltd.).

(2) The inherent viscosity of the polymer was determined according to the following method.

By using a Deereax Bischoff viscometer, the flow time (ts) of a dimethylformamide solution containing 0.5% by weight of a sample polymer and the flow time (to) of dimethylformamide were measured at 25°±0.1° C. The relative viscosity $\eta rel$ of the polymer was determined from the value of ts/to, and the inherent viscosity was calculated according to the following equation:

$$\text{Inherent viscosity} = (\ln \eta rel)/C$$

wherein C represents the amount (grams) of the polymer in 100 ml of the solvent.

(3) The heat distortion temperature was measured according to the method of ASTM D-648.

(4) The total luminous transmittance (%) of the molded article was measured according to the method of ASTM D-1003.

(5) The nitrogen content in the polymer was determined by the elemental analysis by using an elemental analyzer (CHN Coder MT-3 supplied by Yanagimoto Seisakusho).

(6) The thermal decomposition ratio of the polymer was expressed in terms of the weight decrease ratio observed when the polymer was treated at 370° C. in nitrogen for 10 minutes.

EXAMPLE 1

A mixture comprising 65 parts of methyl methacrylate, 35 parts of methanol, 0.11 part of di-tert-butylperoxide and 0.2 part of tert-butylmercaptan was continuously supplied at a rate of 4 l/hr into a first stirring tank type reaction vessel having a capacity of 20 l, and the temperature was maintained at 145° C. In the reaction vessel, sufficient stirring was conducted and a uniform mixing state was attained. When the reaction liquid was sampled just after the reaction vessel and the conversion was measured, it was found that the conversion to a polymer was 65%. The reaction liquid was introduced into a second reaction vessel of the multitubular heat exchanger type (comprising 30 straight tubes having an inner diameter of 12.7 mm and a length of 1000 mm) and th polymerization was advanced at a temperature of 150° C. until the conversion to a polymer was increased to 93%. The polymer liquid was supplied into an imidization reaction vessel of the stirring tank type having an inner capacity of 15 l and maintained at 220° C. Separately, methanol containing 50% of methylamine was supplied at a rate of 1.2 l/hr to the imidization reaction vessel. The reaction liquid coming from the imidization reaction vessel was supplied into a double-vent extruder having a diameter of 30 mm and volatile components were removed, and the polymer was extruded in the form of a strand from a die at the tip of the extruder, and the strand was cut into pellets. In the vented extruder, the vacuum degree of the vent portion was 5 mmHg, the temperature of the vent portion was 260° C., the temperature of the metering portion was 270° C. and the temperature of the die portion was 255° C.

When the infrared absorption spectrum of the obtained pelletized polymer was measured, inherent absorptions of methacrylimide were observed at wave numbers of 1720, 1663 and 750 cm$^{-1}$. Thus, it was confirmed that the polymer was a methacrylimide-containing polymer. The physical properties of the polymer were as follows.

Inherent viscosity: 0.38
Total luminous transmittance (%): 94
Heat distortion temperature (°C.): 162
Nitrogen content (%): 6.7
Thermal decomposition ratio (%): 0.6

EXAMPLE 2

A methacrylimide-containing polymer was prepared under the same conditions as described in Example 1 except that by adjusting the amount of the reaction mixture held in the first reaction vessel, the conversion just after the first reaction vessel was controlled to 37%, and the number of straight tubes in the second reaction vessel was increased to 60 and the reaction prolonged so that the polymerization degree in the second reaction vessel was substantially the same as in Example 1 and the conversion just after the second reaction vessel was 91%.

The physical properties of the polymer were as follows.

Inherent viscosity: 0.37
Total luminous transmittance (%): 93
Heat distortion temperature (°C.): 159
Nitrogen content(%): 6.8
Thermal decomposition ratio (%): 3.6

The polymer was inferior to the polymer of Example 1 in thermal decomposition resistance.

EXAMPLE 3

A methacrylimide-containing polymer was prepared in the same manner as described in Example 1 except that the same plug flow type reaction vessel as the second reaction vessel was used as the first reaction vessel. The conversion just after the first reaction vessel and the conversion just after the second reaction vessel were 71% and 92%, respectively.

The physical properties of the obtained polymer were as follows.

Inherent viscosity: 0.38
Total luminous transmittance (%): 93
Heat distortion temperature (°C.): 158
Nitrogen content (%): 6.7
Thermal decomposition ratio (%): 5.4

The polymer was inferior to the polymer of Example 1 in the thermal decomposition resistance.

COMARATIVE EXAMPLE 1

A methacrylimide-containing polymer was prepared in the same manner as described in Example 1 except that the number of straight tubes in the second reaction vessel was changed to 6 and the conversion just after the second reaction vessel was 72%.

The physical properties of the polymer were as follows.

Inherent viscosity: 0.37
Total luminous transmittance (%): 86
Heat distortion temperature (°C.): 147
Nitrogen content (%): 7.0
Thermal decomposition ratio (%): 6.9

The polymer was strongly yellowish and was inferior to the polymer of Example 1 in luminous transmittance, and the heat distortion temperature of the polymer was lower. The reason is considered to be that since the final conversion just after the second reaction vessel was as low as 72%, a high-boiling-point by-product formed by the reaction of a large amount of the residual unreacted monomer with methylamine was not sufficiently removed but was left in the polymer. Furthermore, it is considered that such a high thermal decomposition ratio as 6.9% was due to the presence of the above-mentioned high-boiling-point by-product in the polymer.

EXAMPLE 4

In the same manner as described in Example 1, 70 parts of methyl methacrylate, 30 parts of toluene, 0.09 part of dicumyl peroxide and 0.22 part of n-octylmercaptan were subjected to polymerization. The temperature of the first reaction vessel was 140° C., the conversion just after the first reaction vessel was 73%, the temperature of the second reaction vessel was 135° C. and the conversion just after the second reaction vessel was 91%. The polymerization liquid was fed to the second imidization reaction vessel maintained at 230° C., and in the same manner as described in Example 1, the polymer was imidized while mixing and stirring the polymerization liquid by methanol containing 50% of methylamine, which was fed at a rate of 1.5 l/hr, whereby a pelletized methacrylimide-containing polymer was finally obtained.

The properties of the obtained polymer were as follows.

Inherent viscosity: 0.36
Total luminous transmittance (%): 94
Heat distortion temperature (°C.): 177
Nitrogen content (%): 7.4
Thermal decomposition ratio (%): 0.7

EXAMPLE 5

In the same manner as described in Example 1, 65 parts of methyl methacrylate, 5 parts of methyl acrylate, 20 parts of methanol, 10 parts of toluene, 0.06 part of di-tert-butylperoxide, 0.05 part of dicumyl peroxide and 0.21 part of tert-butylmercaptan were subjected to polymerization. The temperature of the first reaction vessel was 140° C., the conversion just after the first reaction vessel was 71%, the temperature of the second reaction vessel was 150° C. and the conversion just after the second reaction vessel was 95%. The polymerization reaction liquid was fed to the imidization reaction vessel maintained at 250° C., and imidization was carried out in the same manner as described in Example 1, whereby a pelletized methacrylimide-containing polymer was finally obtained.

The physical properties of the obtained polymer were as follows.

Inherent viscosity: 0.30
Total luminous transmittance (%): 9
Heat distortion temperature (°C.): 160
Nitrogen content (%): 6.7
Thermal decomposition ratio (%): 0.7

EXAMPLE 6

A pelletized methacrylimide-containing polymer was prepared in the same manner as described in Example 1 except that the imidizing substance supplied to the imidizing reaction vessel was changed to ethylamine.

The physical properties of the obtained polymer were as follows.

Inherent viscosity: 0.33

Total luminous transmittance (%): 93
Heat distortion temperature (°C.): 155
Nitrogen content (%): 6.5
Thermal decomposition ratio (%): 0.8

EXAMPLE 7

In the same manner as described in Example 1, 60 parts of tert-butyl methacrylate, 30 parts of toluene, 0.1 part of di-tert-butyl peroxide, 0.08 part of dicumyl peroxide and 0.25 part of n-octylmercaptan were subjected to polymerization. The temperature of the first reaction vessel was 145° C., the conversion just after the first reaction vessel was 70%, the temperature of the second reaction vessel was 153° C. and the conversion just after the second reaction vessel was 92%. The polymerization reaction liquid was fed to the imidization reaction vessel maintained at 230° C., and the polymer was imidized in the same manner as described in Example 1 while mixing and stirring the polymerization reaction liquid by methanol containing 50% of methylamine, which was supplied at a rate of 1.9 l/hr, whereby a pelletized polymer having the following physical properties was finally obtained.

Inherent viscosity: 0.31
Total luminous transmittance (%): 92
Heat distortion temperature (°C.): 188
Nitrogen content (%): 8.2
Thermal decomposition ratio (%): 0.8

EXAMPLE 8

The polymerization was carried out in the same manner as described in Example 4 except that 0.06 part of 2,2'-azobisisobutyronitrile and 0.03 part of 2,2'-azobis-2,4,4,-trimethylpentane were used as the catalyst. The temperature of the first reaction vessel was 85° C., the conversion just after the first reaction vessel was 69%, the temperature of the second reaction vessel was 130° C. and the conversion just after the second reaction vessel was 94%. The polymerization reaction liquid was fed into the imidization reaction vessel maintained at 225° C. In the same manner as described in Example 4, the polymer was imidized by mixing and stirring the polymerization reaction liquid by methanol containing 55% of methylamine, which was fed at a rate of 1.5 l/hr, whereby a pelletized methacrylimide-containing polymer was finally obtained.

The physical properties of the obtained polymer were as follows.

Inherent viscosity: 0.37
Total luminous transmittance (%): 94
Heat distortion temperature (°C.): 171
Nitrogen content (%): 7.1
Thermal decomposition ratio (%): 0.6

EXAMPLE 9

The polymerization was carried out in the same manner as described in Example 4 except that 0.045 part of 2,2'-azobis(2,4-dimethylvaleronitrile) and 0.08 part of dicumyl peroxide were used as the initiator. The temperature of the first reaction vessel was 65° C., the conversion just after the first reaction vessel was 63%, the temperature of the second reaction vessel was 135° C. and the conversion just after the second reaction vessel was 90%. The polymerization reaction liquid was fed into the imidization reaction vessel maintained at 240° C. and in the same manner as described in Example 4, the polymer was imidized while mixing and stirring the polymerization reaction liquid by methanol containing 55% of methylamine, which was fed at 1.5 l/hr, whereby a pelletized methacrylimide-containing polymer was finally obtained.

The physical properties of the obtained polymer were as follows.

Inherent viscosity: 0.39
Total luminous transmittance (%): 94
Heat distortion temperature (°C.): 180
Nitrogen content (%): 7.7
Thermal decomposition ratio (%): 0.7

EXAMPLE 10

A pelletized methacrylimide-containing polymer was prepared in the same manner as described in Example 9 except that 0.07 part of 1,1'-azobis(1-cyclohexanecarbonitrile) was used as the nitiator instead of 0.08 part of dicumyl peroxide and the temperature of the second reaction vessel was changed to 105° C. The conversion just after the second reaction vessel was 91%.

The physical properties of the obtained polymer were as follows.

Inherent viscosity: 0.41
Total luminous transmittance (%): 94
Heat distortion temperature (°C.): 179
Nitrogen content (%): 7.6
Thermal decomposition ratio (%): 0.7

EXAMPLE 11

A mixture comprising 75 parts of methyl methacrylate, 25 parts of toluene, 0.15 part of dicumyl peroxide and 0.24 part of n-octylmercaptan was continuously supplied at a rate of 2.5 l/hr into the same first stirring tank type reaction vessel as used in Example 1. The temperature of the reaction vessel was maintained at 150° C. The mixture in the reaction vessel was sufficiently stirred to attain a uniform mixing state. When the reaction liquid was sampled just after the reaction vessel and the conversion to a polymer was measured, it was found that the conversion was 85%. Then, in the same manner as described in Example 1, the polymer was imidized, and a pelletized methacrylimide-containing polymer was finally obtained. The flow rate of methanol containing methylamine was 0.7 l/hr.

The physical properties of the obtained polymer were as follows.

Inherent viscosity: 0.37
Total luminous transmittance (%): 92
Heat distortion temperature (°C.): 160
Nitrogen content (%): 6.6
Thermal decomposition ratio (%): 1.2

EXAMPLES 12 through 14

The procedures of Examples 4 were repeated in the same manner except that the apparatus shown in FIG. 1 was used as the imidization reaction vessel. The interior of the reaction apparatus was divided into 2, 3 or 4 sections by changing the number of partition plates 27. In order to clarify the difference of the transparency among the obtained polymers, each polymer was formed into a light-transmitting member in a manner described below and the transparency was evaluated based on the light-transmitting capacity of the light-transmitting member.

The obtained pelletized polymer was charged into a barrel having an inner diameter of 40 mm and provided with a heater on the outside, and the polymer was molten and extruded at a constant speed from a nozzle having an inner diameter of 3 mm and disposed in the bottom of the barrel by means of a piston. The extrudate was coated with a 35% solution of a 2,2,2-trifluoroethyl methacrylate polymer (having a weight average molecular weight of $8 \times 10^4$) in ethyl acetate through a dipping pot. The coated product was air-dried at 120° C. and wound on a bobbin through a nip roller. The thus-obtained strand-shaped light-transmitting member having an outer diameter of 1 mm was evaluated with respect to the light-transmitting capacity by an apparatus shown in FIG. 2.

Referring to FIG. 2, rays from a halogen lamp 12 driven by a stabilized power source 11 are paralleled by a lens 13. The paralleled rays are monochromatized by an interference filter 14 and are collected on the focus of a lens 15 having the same numerical aperture as that of a strand-shaped light-transmitting member 10.

The light-transmitting member 10 is arranged so that the incident end face 16 of the light-transmitting member 10 is located on this focus, and the rays are made incident on the light-transmitting member 10. The rays incident from the incident end face 16 are attenuated and emitted from the outgoing end face 17 of the light-transmitting member 10.

The outgoing rays are converted to an electrical current by a photo diode 18 having a sufficiently broad area. The electrical current is amplified by an amplifier 19 of the current-voltage conversion type and a voltage value is read on a voltage meter 20

The light-transmitting capacity is evaluated according to the following procedures. Both the end faces of the light-transmitting member 10 are cut orthogonally to the strand axis so that the length of the light-transmitting member 10 is lo, and both the cut end faces are smoothened. The light-transmitting member 10 is attached to the above-mentioned apparatus so that the incident end face 16 and outgoing end face 17 do not move during the measurement. The measurement room is darkened and the indicated value on the voltage meter is read. This voltage value is designated as $I_1$. Then, the measurement room is lighted and the outgoing end face 17 is separated from the apparatus, and the light-transmitting member 10 is cut out at a point 21 distant by a length l from the end face 17. Then, the end face of the light-transmitting member attached to the apparatus is smootheeed orthogonally to the strand axis in the same manner as described above and this end face is attached to the apparatus as a new outgoing end face.

In order to keep the quantity of the incident light constant during the operation, care is taken so that the incident end face 16 does not move. The measurement room is darkened again, and the indicated value of the voltage meter is read and designated as $I_2$. The light transmission loss ($\alpha$) is calculated according to the following equation:

$$\alpha = (10/l) \log (I_2/I_1) \text{ (dB/km)}$$

wherein l represents the length (km) of the light-transmitting member, and each of $I_1$ and $I_2$ represents the light quantity (the value read on the voltage meter).

The measurement conditions adopted in the examples are as follows.

Interference filter (main wavelength): 646 nm
lo (total length of light-transmitting member): 2 m (or 5 m)
l (cut length of light-transmitting member): 1.5 m (or 4.5 m)
D (diameter of bobbin): 190 mm The bobbin is used to render the apparatus compact, and the distance between the incident end face 16 and outgoing end face 17 is adjusted to about 30 cm and the remainder of the light-transmitting member is wound on the bobbin (not shown).

The main wavelength of the interference filter can be changed in the range of from 400 nm to 1200 nm.

The numerical aperture of the light-transmitting member was measured by using an apparatus shown in FIG. 3.

Referring to FIG. 3, a halogen lamp is installed in a parallel ray source 31, and the output rays of the light source 31 are monochromatized through an interference filter 32 having a central wavelength of 650 nm and a half-value width of 3 nm, and the parallel rays are focussed by a lens 33 having a numerical aperture larger than that of the light-transmitting member and made incident on one end face 35 of the light-transmitting member 34. The end face 35 is formed by cutting the light-transmitting fiber orthogonally to the strand axis and smoothening the cut face, and the end face 35 is fixed by a fixing member 36 so that the optical axis 37 is in agreement with the strand axis.

The incident light passes through the light-transmitting member having the total length l and goes out from the other end face 38. The end face 38 smoothened orthogonally to the strand axis is fixed along the fixing axis 39 by a fixing member 40 so that the fixing axis 39 is orthogonal to the strand axis. A rotary arm 41 is rotatable around the center of the fixing axis 39, and the rotation angle $\theta$ can be read. A light-detecting photomultiplier tube 42 is attached within a case 43 to measure the quantity of the light passing through a hole 44 as an electrical current.

The diameter of the hole 44 is 1.5 mm and the hole 44 is located at a position 125 mm apart from the center axis.

Figure 4:
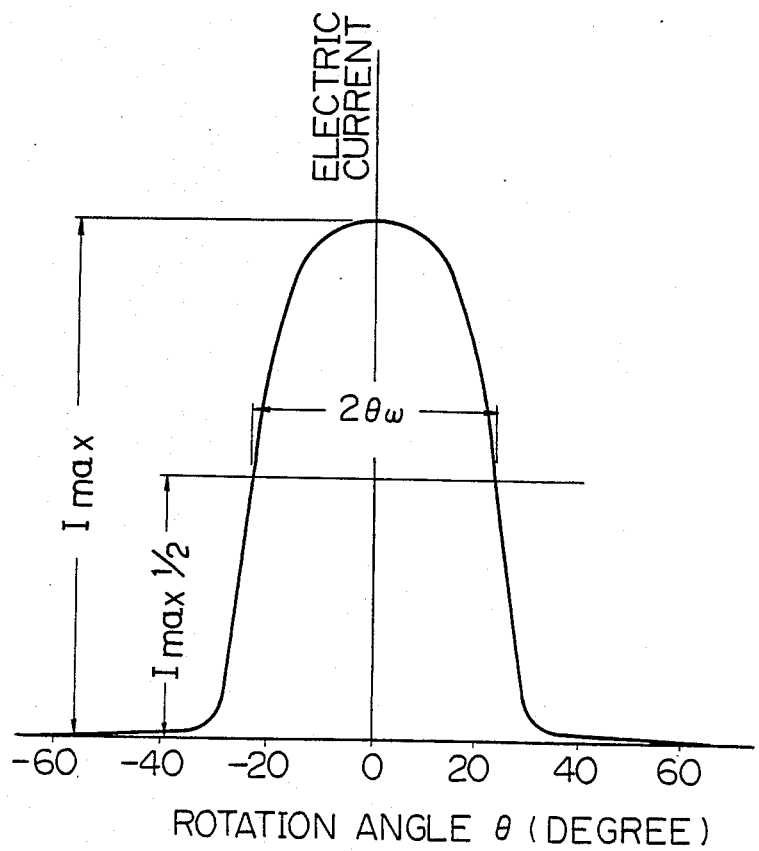
FIG. 4 illustrates an example of the measurement result obtained by the measurement apparatus shown in FIG. 3.

The distribution of outgoing rays is measured as the relation between the rotation angle $\theta$ of the rotary arm and the current of the photomultiplier tube, and an example is shown in FIG. 4. Referring to FIG. 4, supposing that the maximum current is Imax, the numerical aperture (NA) can be calculated from the angle width $2\theta w$ for reduction of Imax to ½ according to the following equation:

$$NA = \sin\theta w$$

The thus-obtained light-transmitting capacity and other physical properties are shown in Table 1. For reference, also those of the polymer obtained in Example 4 are shown in Table 1.

TABLE 1

|  | Example 4 | Example 12 | Example 13 | Example 14 |
|---|---|---|---|---|
| Number of Imidiazation Reaction Zones | 1 | 2 | 3 | 4 |
| Light-Transmitting Capacity (dB/km) | 490 | 343 | 235 | 205 |
| Inherent Viscosity | 0.36 | 0.38 | 0.39 | 0.39 |
| Heat Distortion Temperature (°C.) | 177 | 179 | 180 | 180 |
| Thermal Decomposition Ratio (%) | 0.7 | 0.7 | 0.6 | 0.6 |

We claim:

1. A process for the preparation of methacrylimide-containing polymers, which comprises:
   (a) solution polymerizing 90 to 40% by weight of methacrylic acid, amethacrylic acid ester or a monomer mixture comprising at least 50% by weight of methacrylic acid or methacrylic acid ester in 10 to 60% by weight of an inert solvent in the presence of a radical polymerization initiator and a molecular weight modifier in polymerization reaction zone, thereby converting at least 80% by weight of the charged monomer to a polymer at a temperature of 60° to 170° C.;
   (b) adding to the polymerization solution formed in step (a) a compound of the formula:

R—NH$_2$ wherein R represents a hydrogen atom, an alkyl group having 1 to 12 carbon atoms, a cycloalkyl group having 7 to 11 carbon atoms;
   (c) reacting the resulting mixture at a temperature of 150° to 300° C. in an imidization reaction zone; and
   (d) finally separating volatile substances from the reaction liquid.

2. The process accroding to claim 1, wherein the amount of the inert solvent is 20 to 50% by weight based on the total weight of the inert solvent and the monomer or monomers.

3. The process according to claim 1, wherein the inert solvent in the imidization reaction zone is a mixed solvent comprising a poor solvent having a boiling point of 50° to 135° C. under atmospheric pressure which does not easily dissolve the methacrylic acid ester polymer therein at normal temperature and a good solvent having a boiling point of 50° to 135° C. under atmospheric pressure which is capable of easily dissolving the methacrylic acid ester polymer therein at normal temperature.

4. The process according to claim 1, wherein the solubility parameter value δ of the poor solvent is 14.0 to 19.5 (cal/cm$^3$)$^{\frac{1}{2}}$.

5. The process according to claim 1, wherein the solubility parameter value δ of the good solvent is 8.5 to 13.9 (cal/cm$^3$)$^{\frac{1}{2}}$.

6. The process according to claim 1, wherein at least 90% by weight of the charged monomer is converted to a polymer in the polymerization reaction zone.

7. The process according to claim 1, wherein the charged monomer is converted to a polymer at a temperature of 65° to 160° C. in the polymerization reaction zone.

8. The process according to claim 1, wherein the amount of the compound of the formula RNH$_2$ is at least 20% by mole based on the monomer units of the polymer.

9. The process according to claim 1, wherein the compound of the formula RNH$_2$ is ammonia or methylamine.

10. The process according to claim 1, wherein the reaction in the imidization reaction zone is carried out at a temperature of 170° to 280° C.

11. The process according to claim 1, wherein the volatile substances are separated by heating the reaction liquid at a temperature of 200° to 300° C. under a reduced pressure.

12. A process for the perparation of methacrylimide-containing polymers, which comprises:
   (a) solution polymerizing 90 to 40% by weight of methacrylic acid, a methacrylic acid ester or a monomer mixture comprising at least 50% by weight of methacrylic acid or a methacrylic acid ester in 10 to 60% by weight of an inert solvent in the presence of a radical polymerization initiator and a molecula weight modifier in a polymerization reaction zone, where the ingredients are substantially homogeneously mixed, thereby converting at least 40% by weight of the charged monomer toa polymer at a temperature of 60° to 170° C.;
   (b) further converting at least 80% by weight of the monomer to a polymer at a temperature of 80° to 170° C. in a second polymerization reaction zone having a plug flow;
   (c) adding to the polymerization solution of step (b) a compound of the formula: R—NH$_2$, wherein R represents a hydrogen atom, an alkyl group having 1 to 12 carbon atoms, a cycloalkyl group having 7 to 11 carbon atoms or an aryl group having 6 to 10 carbon atoms;
   (d) reacting the resuulting mixture at a temperature of 150° to 300° C. in an imidization reaction zone; and
   (e) finally separating volatile substances from the reaction liquid.

13. The process according to claim 12, wherein the amount of the inert solvent is 20 to 50% by weight based on the total weight of the inert solvent and, the monomer or monomers.

14. The process according to claim 12, wherein the conversion to the polymer in the first polymerization zone is at least 60% by weight and the conversion to the polymer in the second polymerization zone is at least 90% by weight.

15. The process according to claim 12, wherein the charged monomer is converted to a polymer at a temperature of 65° to 160° C. in the polymerization reaction zone of step (a).

16. The process according to claim 12, wherein the imidization reaction zone comprises at least two partitioned reaction zones where the reaction mixture is sufficiently stirred.

17. The process according to claim 12, wherein the inert solvent in the imidization reaction zone is a mixed solvent comprising a poor solvent having a boiling point of 50° to 135° C. under atmospheric pressure which does not easily dissolving a methacrylic acid ester polymer therein at normal temperature and a good solvent having a boiling point of 50° to 135° C. under atmospheric pressure which is capable of easily dissolving a methacrylic acid ester polymer therein at normal temperature.

18. The process according to claim 17, wherein the solubility parameter value δ of the poor solvent is 14.0 to 19.5 (cal/cm$^3$)$^{\frac{1}{2}}$.

19. The process according to claim 17, wherein the solubility parameter value δ of the good solvent is 8.5 to 13.9 (cal/cm$^3$)$^{\frac{1}{2}}$.

20. The process according to claim 12, wherein the amount of the compound of the formula RNH$_2$ is at least 20% by mole based on the monomer units of the polymer.

21. The process according to claim 12, wherein the compound of the formula RNH$_2$ is ammonia or methylamine.

22. The process according to claim 12, wherein the reaction in the imidization reaction zone is carried out at a temperature of 170° to 280° C.

23. The process according to claim 12, wherein the volatile substances are separated by beating the reaction liquid at a temperature of 200° to 300° C. under a reduced pressure.

* * * * *